(12) United States Patent
Su (10) Patent No.: US 8,553,399 B2
(45) Date of Patent: Oct. 8, 2013

(54) ELECTRONIC DEVICE WITH LOCKING ASSEMBLY

(75) Inventor: Feng-Ching Su, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 196 days.

(21) Appl. No.: 13/188,409

(22) Filed: Jul. 21, 2011

(65) Prior Publication Data

US 2012/0293925 A1    Nov. 22, 2012

(30) Foreign Application Priority Data

May 18, 2011   (TW) .............................. 100208840 A (51) Int. Cl.
  *G06F 1/16*    (2006.01)
(52) U.S. Cl.
  USPC ...... 361/679.02; 345/214; 349/150; 174/255; 455/575.3
(58) Field of Classification Search
  USPC ............... 361/679.31, 679.34, 679.21, 679.4, 361/679.01, 679.44, 679.27, 679.41, 679.09, 361/679.28, 679.58, 679.08, 679.26, 679.48, 361/679.23, 679.38; 345/214, 76, 173, 60, 345/204, 78, 168, 174; 349/113, 137, 114, 349/149, 155, 150, 100, 167; 174/50, 135, 174/520, 547, 564, 42, 255; 312/223.2, 276, 312/328, 140.2; 455/575.1, 575.3
  See application file for complete search history.

(56) References Cited

U.S. PATENT DOCUMENTS

| | | | |
|---|---|---|---|
| 2010/0039766 A1* | 2/2010 | Chiang et al. ............ | 361/679.34 |
| 2012/0147547 A1* | 6/2012 | Lin et al. .................. | 361/679.31 |
| 2013/0014974 A1* | 1/2013 | Burke et al. ................. | 174/135 |

* cited by examiner

*Primary Examiner* — Hung Duong
(74) *Attorney, Agent, or Firm* — Altis & Wispro Law Group, Inc.

(57) ABSTRACT

An electronic device includes an enclosure defining a first receiving hole and a locking assembly. The first receiving hole defines a first passing portion and a first locking portion smaller than and communicating with the first passing portion. The locking assembly includes a fixed member fixed to the enclosure and a rubber cover tightly sandwiched between the fixing member and the enclosure. The rubber cover includes a block portion extending to and received in the first passing portion of the first receiving hole. When a fastener on a wall is positioned at the first locking portion by way of the first passing portion, the block portion of the rubber cover blocks the first passing portion to prevent the fastener from moving away the first locking portion.

19 Claims, 8 Drawing Sheets

ELECTRONIC DEVICE WITH LOCKING ASSEMBLY

BACKGROUND

1. Technical Field

The present disclosure relates to electronic devices, and more particularly to a locking assembly of an electronic device.

2. Description of Related Art

Many electronic devices, such as IP phones, or LCD TVs, are mounted on walls by use of bolts or other fasteners. Generally, these electronic devices are configured with a groove to receive the bolts or fasteners. However, the electronic devices are not always configured with a structure to lock or secure the electronic device to the fastener. The lack of such structure can lead to potential disengagement of the electronic device from the fastener, and correspondingly result in damage to the electronic device.

Therefore, there is room for improvement within the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
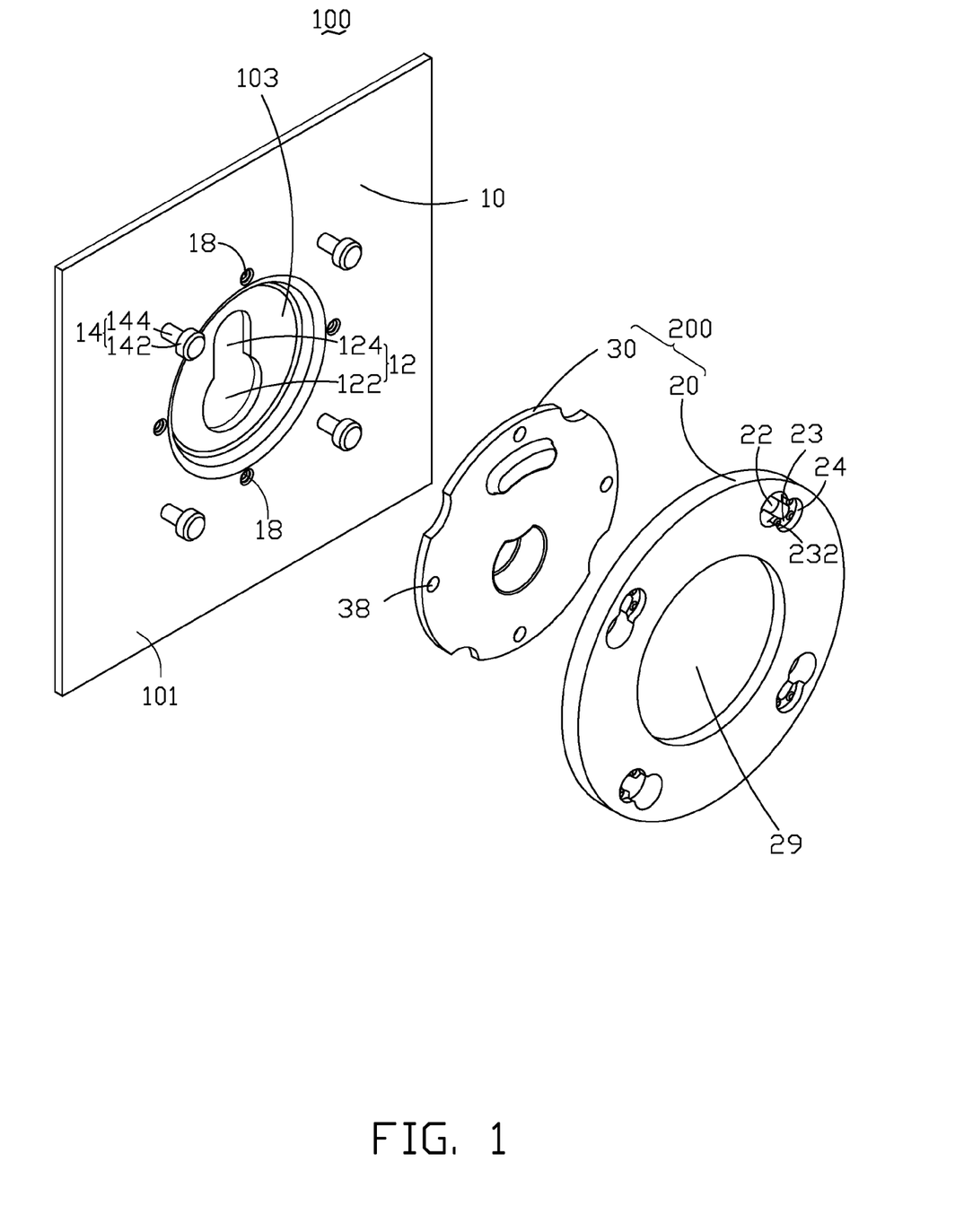
FIG. 1 is an exploded, isometric view of an electronic device of an exemplary embodiment of the disclosure.
Figure 2:
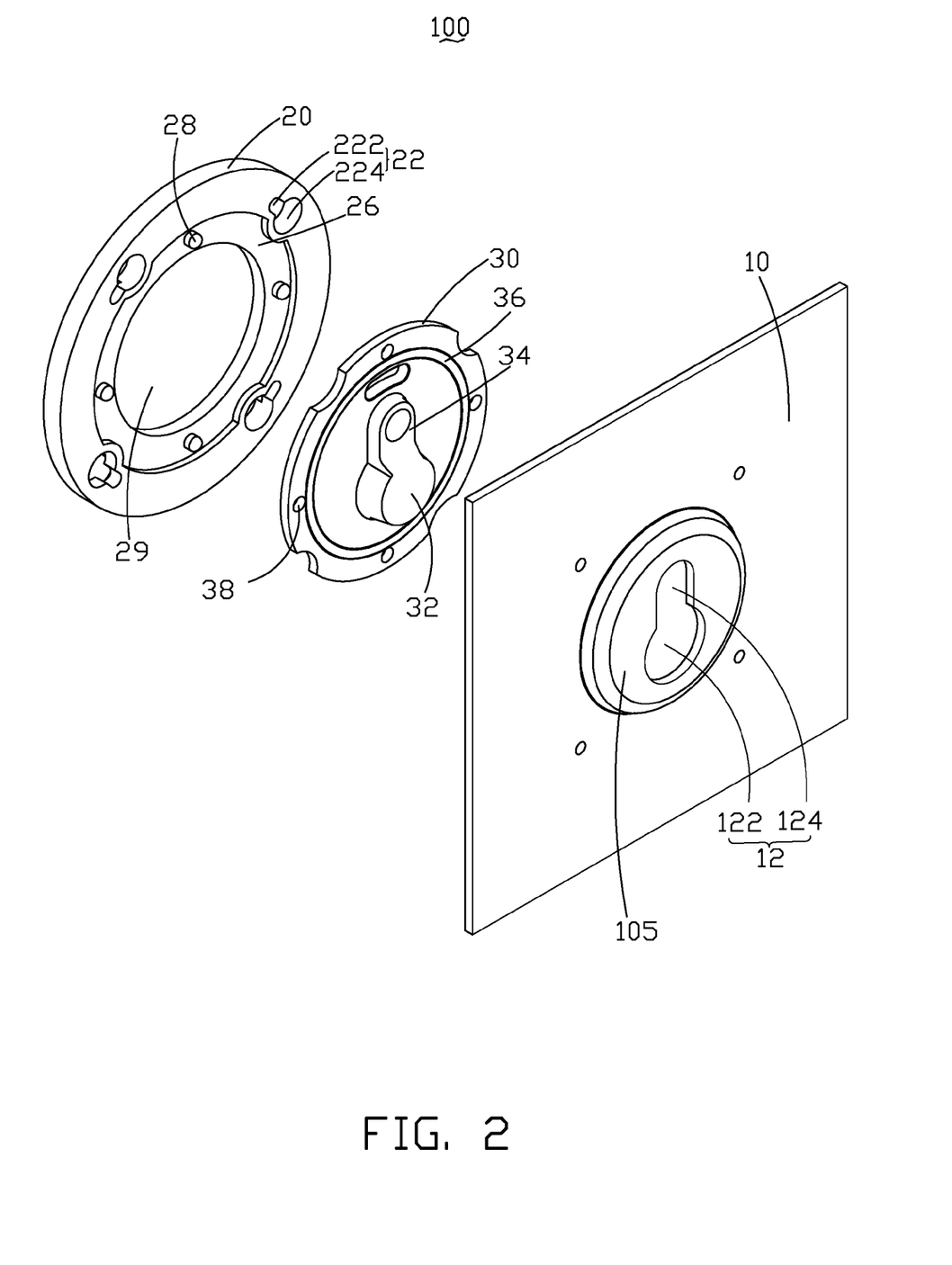
FIG. 2 is an exploded, isometric view of the electronic device of FIG. 1, showing the electronic device from another direction.
Figure 3:
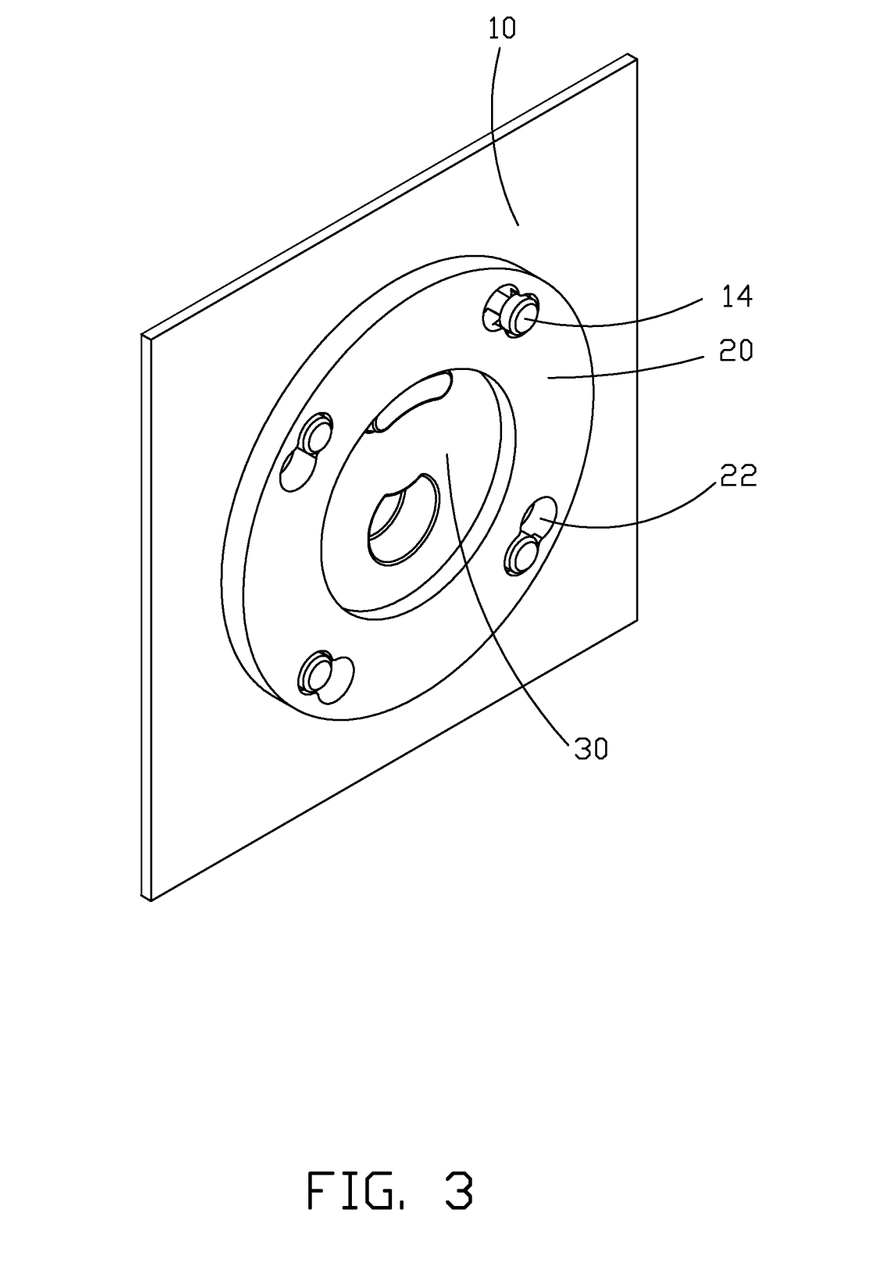
FIG. 3 is an assembled view of the electronic device of FIG. 1.

Referring to FIGS. 1-3, a portion of an electronic device 100 of an exemplary embodiment of the present disclosure is illustrated. The electronic device 100 includes an enclosure 10 and a locking assembly 200 attached to an inner surface 101 of the enclosure 10. The electronic device 100 may be but not limited to a phone, a router, a switch, or an LCD TV, for example.

The enclosure 10 defines a first receiving hole 12 defining a first passing portion 122 and a first locking portion 124 smaller than and communicating with the first passing portion 122. In this embodiment, the enclosure 10 comprises a convex stage 105 projecting outwardly from and defining a receiving room 103 recessing in the inner surface 101. The first receiving hole 12 is defined in the convex stage 105. The enclosure 10 comprises a plurality of fixing posts 14 located around the first receiving hole 12 and protruding from the inner surface 101. Each of the fixing posts 14 comprises a latching portion 142 and a rod portion 144 connecting between the latching portion 142 and the inner surface 101.

Figure 4:
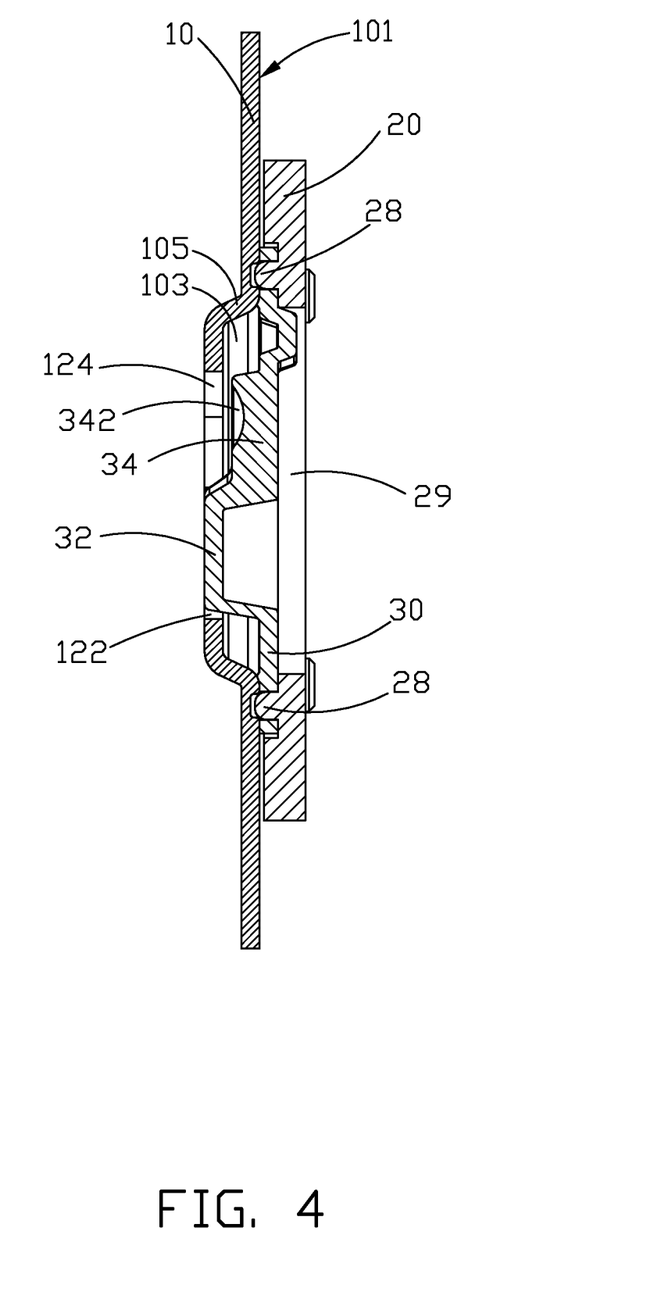
FIG. 4 is a cross section view of the electronic device of FIG. 3.

The locking assembly 200 comprises a fixing member 20 fixed to the inner surface 101 of the enclosure 10 to cover the first receiving hole 12 and a rubber cover 30 tightly sandwiched between the fixing member 20 and the enclosure 10. The fixing member 20 defines a receiving space 26 to position the rubber cover 30. Referring to FIG. 4, the rubber cover 30 covers the first receiving hole 12. The rubber cover 30 comprises a block portion 32 extending to and received in the first passing portion 122 of the first receiving hole 12 and an urging portion 34 opposite to the first locking portion 124 of the first receiving hole 12. In this embodiment, the rubber cover 30 comprises a seal ring 36, which would protrude toward the enclosure 10 and surrounding the first receiving hole 12 in assembly to provide waterproof function between the enclosure 10 and the locking assembly 200.

Figure 5:
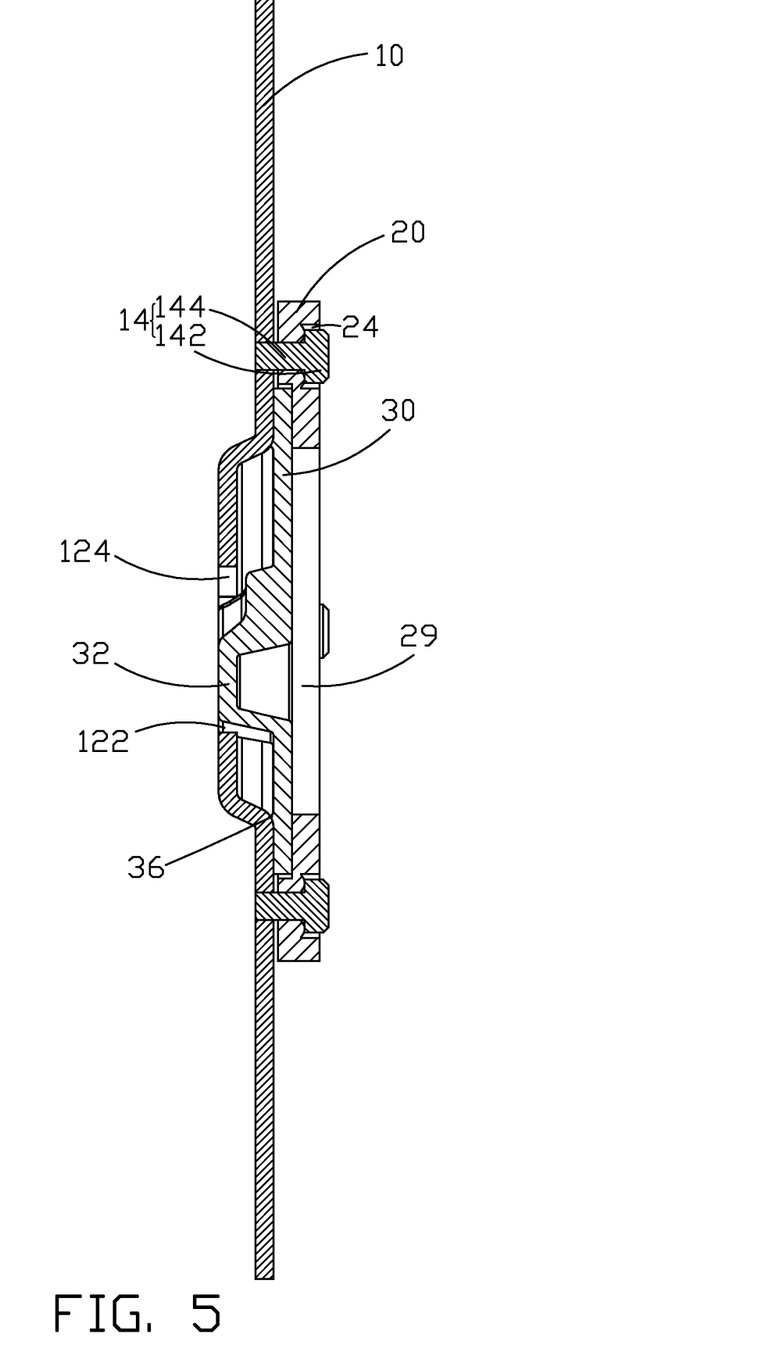
FIG. 5 is another cross section view of the electronic device of FIG. 3.

In this embodiment, the fixing member 20 defines a plurality of second receiving holes 22, each of which defines a second passing portion 224 and a second locking portion 222 smaller than and communicating with the second passing portion 224. Referring to FIG. 5, the plurality of fixing posts 14 respectively engage with the plurality of second receiving holes 22 to fix the fixing member 20 to the enclosure 20 via the latching portions 142 of the fixing posts 14 respectively passing through the corresponding second passing portions 224 of the second receiving holes 22 and being locked at the second locking portion 222.

The fixing member 20 defines a plurality of receiving grooves 24 respectively located one side of the corresponding second locking portions 222 of the second receiving holes 22 away from the enclosure 10. The plurality of receiving grooves 24 and the corresponding second locking portions 222 collectively form a plurality of step portions 23 engaging with the latching portions 142 of the fixing posts 14 received in the receiving grooves 24 correspondingly, to fix the fixing member 20 to the enclosure 10. Each of the step portions 23 comprises at least one protrusion 232 used to contact the latching portions 142 to securely connect the fixing member 20 to the enclosure 10.

During mounting the fixing member 20 to the enclosure 10, the second passing portions 224 are aligned with the corresponding latching portions 142 respectively. The fixing member 20 is moved toward the inner surface 101 of the enclosure 10 and the latching portions 142 respectively pass through the corresponding second passing portions 224. Ultimately, the fixing member 20 is rotated relatively to the enclosure 10 to make the latching portions 142 engage with the plurality of step portions 23 respectively. Therefore, the fixing member 20 is mounted to or released from the enclosure 10 easily without any tools.

In this embodiment, the enclosure 10 defines a plurality of positioning recesses 18 around the first receiving hole 12. Correspondingly, the fixing member 20 comprises a plurality of positioning posts 28 respectively passing through a plurality of through holes 38 of the rubber cover 30 to engage with the plurality of positioning recesses 18 so as to position the rubber cover 30 between the fixing member 20 and the enclosure 10. The fixing member 20 defines a through hole 29 corresponding to the first receiving hole 12 of the enclosure 10 to receive the rubber cover 30 in a deforming state.

In this embodiment, the fixing member 20 defines a receiving space 26 surrounded by the second receiving holes 22 to position the rubber cover 30. The plurality of positioning posts 28 are configured to be received in the receiving space 26. Edge of the rubber cover 30 is positioned in the receiving space 26 via engagement between the plurality of positioning posts 28 and the plurality of through holes 38.

Figure 6:
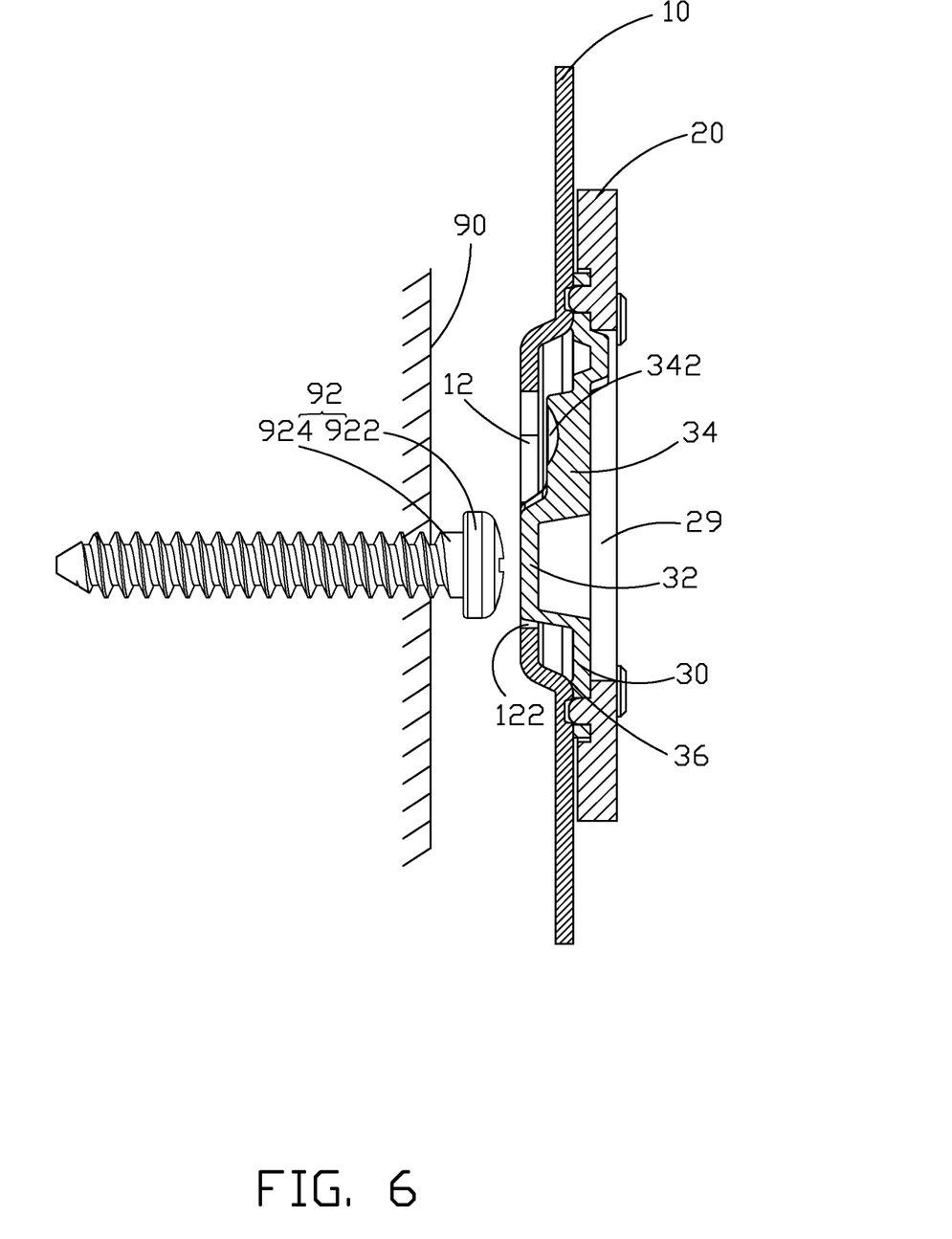
FIG. 6 is a schematic view showing the electronic device of FIG. 1 away from a fastener fixed in a wall.
Figure 7:
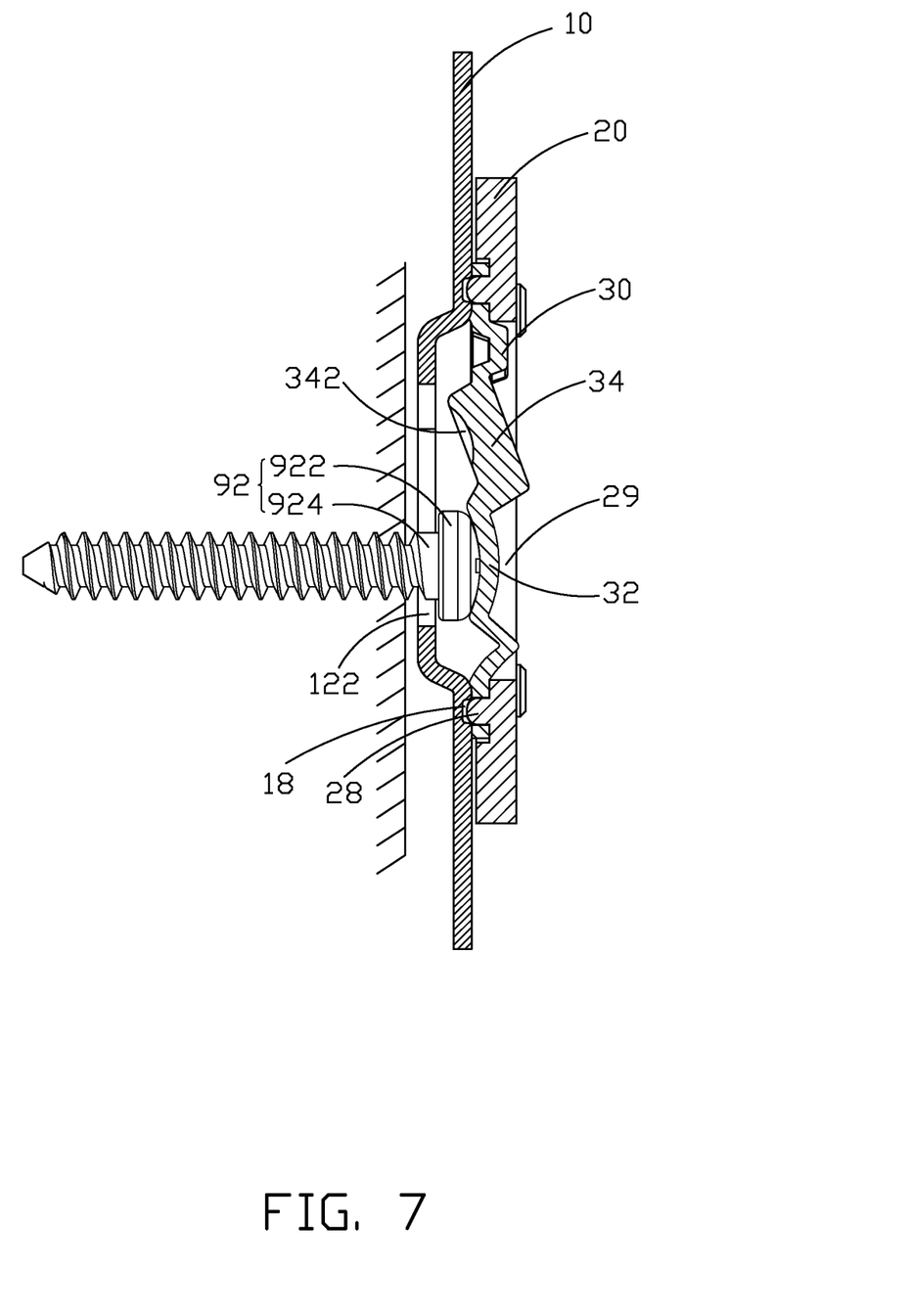
FIG. 7 illustrates a head of the fastener passes through the electronic device of FIG. 6 with a block portion of a rubber cover being pressed to be deformed.
Figure 8:
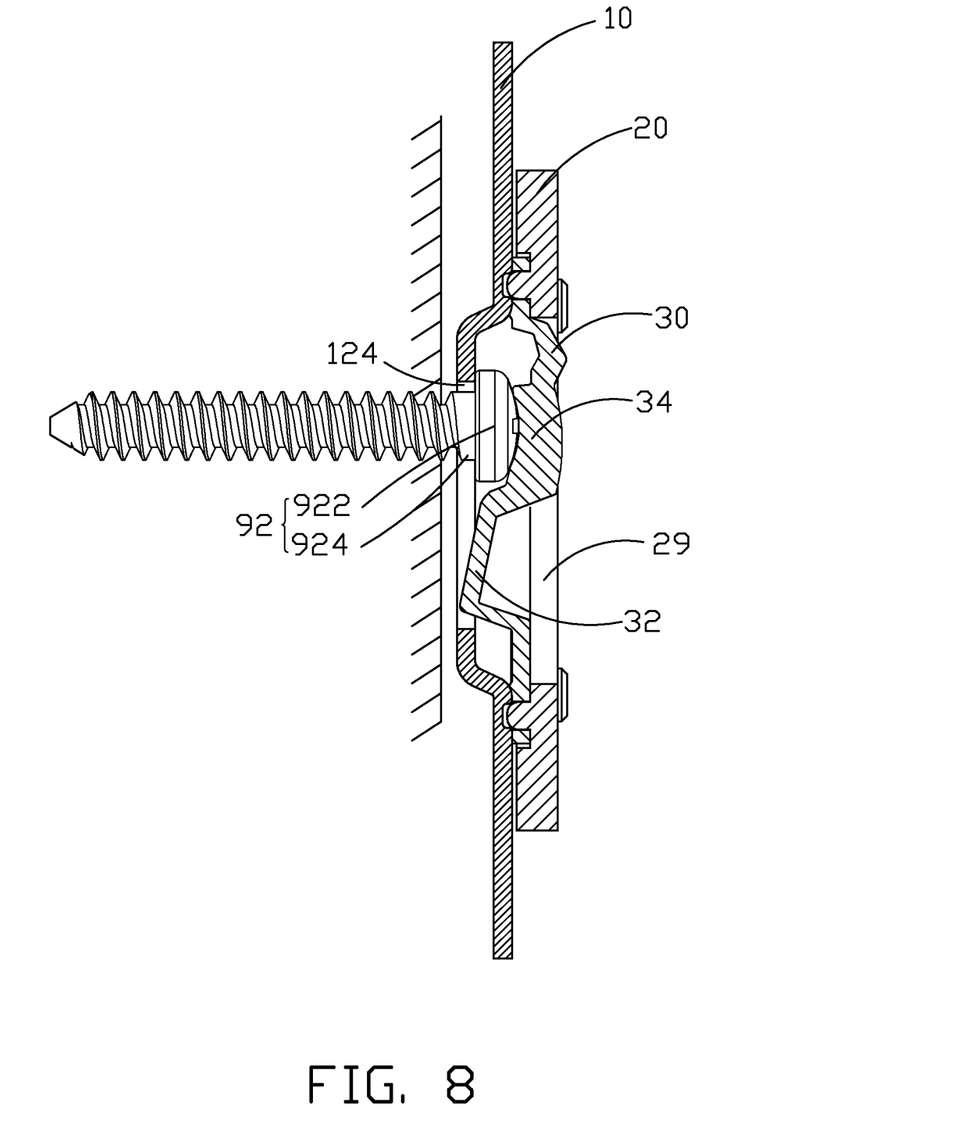
FIG. 8 illustrates the electronic device of FIG. 7 being locked with the fastener.

FIGS. 6-8 are schematic views illustrating the electronic device 100 is fixed to a fastener 92 on a wall 90. The fastener 92 comprises a head 922 and a pole 924. The rubber cover 30 allows the fastener 92 to be positioned in the first receiving hole 12 and prevent the fastener 92 from moving away the first receiving hole 12 by accident. Referring to FIG. 6, the first receiving hole 12 of the electronic device 100 faces to the wall 90, and the block portion 32 of the rubber cover 30 received in the first passing portion 122 of the first receiving hole 12 is aligned with the head 922 of the fastener 92. Referring to FIG. 7, the head 922 of the fastener 92 pass through the first passing portion 122 and press to deform the block portion 32. The deformation of the block portion 32 gives a space to receive the head 922 of the fastener 92.

Referring to FIG. 8, the electronic device 100 is moved to make the head 922 of the fastener 92 be positioned at the first locking portion 124 of the first receiving hole 12. When the fastener 92 is positioned at the first locking portion 124 by way of the first passing portion 122 of the first receiving hole 12, the urging portion 34 is deformed to urge the fastener 92, and the block portion 32 of the rubber cover 30 recovers and blocks the first passing portion 122 to prevent the head 922 of the fastener 92 from moving away the first locking portion 124, thereby securely mounting the electronic device 100 to the fastener 92. In this embodiment, the urging portion 34 of the rubber cover 30 defines a recess 342 to engage with the fastener 92 to securely fix the electronic device 100 to the fastener 92.

While an embodiment of the present disclosure has been described above, it should be understood that it has been presented by way of example only and not by way of limitation. Thus the breadth and scope of the present disclosure should not be limited by the above-described embodiments, but should be defined only in accordance with the following claims and their equivalents.

What is claimed is:

1. An electronic device, comprising:
an enclosure, defining a first receiving hole defining a first passing portion and a first locking portion smaller than and communicating with the first passing portion; and
a locking assembly, comprising:
a fixing member, fixed to an inner surface of the enclosure; and
a rubber cover, tightly sandwiched between the fixing member and the enclosure, and covering the first receiving hole, the rubber cover comprising a block portion extending to and received in the first passing portion of the first receiving hole;
wherein when a fastener on a wall is positioned at the first locking portion by way of the first passing portion, the block portion of the rubber cover blocks the first passing portion to prevent the fastener from moving away the first locking portion.

2. The electronic device as recited in claim 1, wherein the enclosure comprises a plurality of fixing posts located around the first receiving hole and protruding from the inner surface, each of the fixing posts comprises a latching portion and a rod portion connecting between the latching portion and the inner surface, the fixing member is fixed to the plurality of fixing posts.

3. The electronic device as recited in claim 2, wherein the fixing member defines a plurality of second receiving holes, each of which defines a second passing portion and a second locking portion, the plurality of fixing posts respectively engage with the plurality of second receiving holes to fix the fixing member to the enclosure via the latching portions of the fixing posts respectively passing through the corresponding second passing portions of the second receiving holes and being locked at the second locking portion.

4. The electronic device as recited in claim 3, wherein the fixing member defines a plurality of receiving grooves respectively located one side of the corresponding second locking portions of the second receiving holes away from the enclosure, the plurality of receiving grooves and the corresponding second locking portions collectively form a plurality of step portions engaging with the latching portions of the fixing posts received in the receiving grooves, correspondingly.

5. The electronic device as recited in claim 4, wherein each of the step portions comprises at least one protrusion used to contact the latching portions to securely fixing member to the enclosure.

6. The electronic device as recited in claim 1, wherein the enclosure defines a plurality of positioning recesses around the first receiving hole, the fixing member comprises a plurality of positioning posts respectively passing through the rubber cover to engage with the plurality of positioning recesses to position the rubber cover between the fixing member and the enclosure.

7. The electronic device as recited in claim 1, wherein the fixing member defines a through hole corresponding to the first receiving hole of the enclosure to receive the rubber cover in a deforming state.

8. The electronic device as recited in claim 1, wherein the rubber cover comprises an urging portion opposite to the first locking portion of the first receiving hole, when the fastener is positioned at the first locking portion of the first receiving hole, the urging portion is deformed to urge the fastener.

9. The electronic device as recited in claim 8, wherein the urging portion of the rubber cover defines a recess to engage with the fastener to fix the electronic device to the fastener.

10. The electronic device as recited in claim 1, wherein the rubber cover comprises a seal ring protruding toward the enclosure and surrounding the first receiving hole in assembly to provide waterproof function between the enclosure and the locking assembly.

11. The electronic device as recited in claim 1, wherein the enclosure comprises a convex stage projecting outwardly from and defining a receiving room recessing in the inner surface, the first receiving hole is defined in the convex stage.

12. An electronic device, comprising an enclosure defining a first receiving hole suitable to positioning a fastener supporting the electronic device, a fixing member fixed to an inner surface of the enclosure to cover the first receiving hole, and a rubber cover sandwiched between the fixing member and the first receiving hole to allow the fastener to be positioned in the first receiving hole and prevent the fastener from moving away the first receiving hole by accident, wherein the enclosure comprises a plurality of fixing posts located around the first receiving hole and protruding from the inner surface; each of the fixing posts comprises a latching portion and a rod portion connecting between the latching portion and the inner surface; the fixing member is fixed to the plurality of fixing posts.

13. The electronic device as recited in claim 12, wherein the rubber cover comprises a seal ring protruding toward the enclosure and surrounding the first receiving hole in assembly to provide waterproof function between the enclosure and the locking assembly.

14. The electronic device as recited in claim 13, wherein the first receiving hole defines a first passing portion and a first locking portion smaller than and communicating with the first passing portion, and the rubber cover comprises a block portion extending to and received in the first passing portion.

15. The electronic device as recited in claim 14, wherein the rubber cover comprises an urging portion opposite to the first locking portion of the first receiving hole, when the fastener is positioned at the first locking portion of the first receiving hole, the urging portion is deformed to urge the fastener.

16. The electronic device as recited in claim 15, wherein the urging portion of the rubber cover defines a recess to engage with the fastener to fix the electronic device to the fastener.

17. The electronic device as recited in claim 12, wherein the enclosure defines a plurality of positioning recesses around the first receiving hole, the fixing member comprises a plurality of positioning posts respectively passing through the rubber cover to engage with the plurality of positioning recesses to position the rubber cover between the fixing member and the enclosure.

18. The electronic device as recited in claim 12, wherein the fixing member defines a through hole corresponding to the first receiving hole of the enclosure to receive the rubber cover in a deforming state.

19. The electronic device as recited in claim 12, wherein the fixing member defines a plurality of second receiving holes, each of which defines a second passing portion and a second locking portion, the plurality of fixing posts respectively engage with the plurality of second receiving holes to fix the fixing member to the enclosure via the latching portions of the fixing posts respectively passing through the corresponding second passing portions of the second receiving holes and being locked at the second locking portion.

* * * * *